United States Patent [19]

Grob et al.

[11] Patent Number: 4,797,173
[45] Date of Patent: Jan. 10, 1989

[54] APPARATUS FOR FACE WELDING BUNDLES OF THERMOPLASTIC MOLDINGS UNDER PRESSURE

[75] Inventors: Heinz Gross, Muhltal; Klaus E. Pohlmann; Harmut Schikowsky, both of Darmstadt, all of Fed. Rep. of Germany

[73] Assignee: ROHM GmbH Chemische Fabrik, Darmstadt, Fed. Rep. of Germany

[21] Appl. No.: 874,649

[22] Filed: Jun. 16, 1986

[30] Foreign Application Priority Data

Jun. 21, 1985 [DE] Fed. Rep. of Germany ....... 3522190

[51] Int. Cl.$^4$ ................ B29C 65/18; B29C 65/26; B29C 65/70
[52] U.S. Cl. ................................. 156/498; 156/282; 156/294; 156/296; 156/309.6; 156/499; 156/500; 156/581; 156/583.1
[58] Field of Search ............ 156/80, 282, 296, 309.6, 156/311, 498, 499, 583.1, 583.4, 196, 242, 245, 294, 303.1, 308.2, 308.4, 380.8, 500, 581; 264/248, 263, 327; 425/384

[56] References Cited

U.S. PATENT DOCUMENTS

| | | | |
|---|---|---|---|
| 3,635,639 | 1/1972 | Krebsbach et al. | 425/384 |
| 3,880,695 | 4/1975 | Standley et al. | 156/282 |
| 4,085,185 | 4/1978 | Adair | 264/248 |
| 4,174,991 | 11/1979 | Reuben | 156/282 |
| 4,419,067 | 12/1983 | Graafmann | 425/392 |

FOREIGN PATENT DOCUMENTS 2603615 8/1977 Fed. Rep. of Germany.

Primary Examiner—Merrell C. Cashion, Jr.
Attorney, Agent, or Firm—Oblon, Fisher, Spivak, McClelland & Maier

[57] ABSTRACT

The purpose of the process and the apparatus of the invention is to face weld extruded thermoplastic moldings the end faces of which lie in a plane and the end face edges of which are juxtaposed in a coplanar fashion. The end faces are pressed against a heatable and coolable plate in which grooves are formed corresponding to the cross-section of the end face. The floor of the grooves is heated up to or above the melting temperature of the plastic. The entry of the grooves is thermally insulated from the floor region and, if necessary, can be cooled. When the end faces are sunk into the grooves, the plastic is melted. The plastic melt, rising in the groove, is cooled until solid in the thermally insulated entry region. Following the welding in the floor region, the floor region is cooled below the melting temperature, and the welded bundle is separated from the plate.

11 Claims, 2 Drawing Sheets

APPARATUS FOR FACE WELDING BUNDLES OF THERMOPLASTIC MOLDINGS UNDER PRESSURE

FIELD OF THE INVENTION

The invention relates to a process and an apparatus for face welding bundles of thermoplastic moldings.

BACKGROUND OF THE INVENTION

Commonly assigned application Ser. No. 751,530, filed July 3, 1985, now U.S. Pat. No. 4,733,718, discloses a process in which heat exchangers comprising a bundle of stacked, extruded, plastic tubular plates are face welded into a connected bundle by means of strip heaters placed between the hollow chambers. While satisfactory in many situations, this procedure is difficult to apply to objects with a large internal cavity surrounded by an outer wall—such as, for example, pipes.

German published patent application DE-PS No. 2 603 615 describes a process for welding bundles of thermoplastic pipes wherein each bundle is clamped between two heated plates which are pressed against the ends of the bundle. The ends of the bundle have annular grooves matching the pipes. The ends of the pipes that extend into the grooves are melted and welded together. During this process, however, only negligible pressure can be applied to the bundle because otherwise the melt would be forced out of the grooves, the width of which is larger than the wall thickness of the pipes. The negligible pressure that can be applied, however, does not guarantee that the ends of the pipes will be faultlessly welded together.

OBJECT OF THE INVENTION

The invention is based on the technical problem of welding reliably and faultlessly by means of an improved process and/or an improved apparatus bundles of thermoplastic moldings having an arbitrary cross-section. The end faces of the moldings lie in a plane, and the front ends of the moldings are juxtaposed in a coplanar fashion.

SUMMARY OF THE INVENTION

The invention solves the foregoing technical problem with the plate that has heatable grooves and that can be pressed against the end face of the bundle. The heatable grooves are arranged to match the cross-section of the bundles and are wider than the thickness of the corresponding ends of the coplanarly juxtaposed moldings. In this procedure, the coplanarly juxtaposed ends are sunk into the heated grooves under pressure; the plastic is melted; and then the plastic is cooled below its melting temperature after the melt within the grooves, originating from the coplanarly juxtaposed ends, has fused.

According to the invention, the plate that can be pressed into place is constructed such that the floor of the grooves can be heated to or above the melting temperature of the plastic, but the entrance of the groove is thermally insulated from the floor region so that it remains below the melting temperature of the plastic during the operation. If the influx of heat to the entry region is so high that it exceeds the melting temperature in that region, a cooling apparatus must be attached there.

It is important that the entry region is thermally insulated on all sides. If necessary, the entry region can be cooled at every point where plastic bodies extend into the grooves. This also applies to lateral openings of the grooves, if the plate is smaller than the face of the bundle of moldings.

In the welding process, the heated space of the grooves is filled with the melt by means of the pressure arising from the ends of the molding extending into the grooves. The melt is forced into the gap between the wall of the entry of each groove and the inserted portion of the molding. The melt is there cooled below its melting temperature and solidified.

THE ADVANTAGEOUS EFFECT OF THE INVENTION

The melt that is forced into the entry gap of each groove and that solidifies there forms a seal, sealing the heated space of the groove. This seal prevents the melt from escaping out of the groove on all sides. Thus, according to the invention, it is possible to apply sufficient pressure so that the heated space of the groove is completely filled with the plastic melt, and the juxtaposed ends of the hollow objects are reliably and faultlessly welded together by forming a weld the shape of which is defined by the shape of the groove. The thermal insulation and/or cooling of the entry region not only has the effect of solidifying the melt forced out of the floor region, but it also has the effect of not melting the ends of the hollow objects in this section of the groove—thus transferring the pressure from the floor region to the groove.

APPLICATION OF THE INVENTION

The process and apparatus of the invention serve to produce welded bundles of moldings that are suitable for various purposes. A preferred application is the production of heat exchangers or heat generators. In applying the bundles as heat regenerators, the heat is absorbed from a warm medium flowing through and radiated to a cold medium in a subsequent phase in the operation. For this application it is adequate if the medium can flow through the welded bundle from the face side. If the welded bundles are applied as heat exchangers between two passing mediums of different temperatures, there must be at least two separate line systems. One line is accessible from the end faces of the bundle, and in the other line the medium can flow from the sides of the bundle.

The cross-section of typical heat regenerators and heat exchangers range between 0.1 and 6 $m^2$, and the length ranges between 0.5 and 10 m. The invention, however, also permits the production of even larger or smaller bundles.

PERFORMANCE OF THE INVENTION

The invention is not limited to the welding of plastic moldings of specific shapes. The shape of the moldings is arbitrary as long as it permits two or more pieces to be fused into one bundle such that their edges stack flat at least in some areas and form a common edge, which is referred to herein as the end face. It is preferred that moldings with thin walls be welded together.

The end face which is to be welded in a procedure according to the invention must lie in an area that preferably, but not necessarily, is a plane. The area can also be curved, arched, or bent. A bundle can be welded at one or more end faces. If two faces are to be welded, preferably the two end faces are opposite one another.

Of the different moldings, moldings retaining a constant profile during at least the bulk of their longitudinal expansion (and among these, in turn, moldings having one or more hollow chambers) are preferred. Such moldings can be produced by means of extrusion and have end face surfaces transverse to the direction of extrusion. Preferably all of the hollow objects joined into one bundle have the same length, so that one bundle with two planar end face surfaces can be produced. Preferably the two end faces are welded, usually simultaneously, in the context of the invention.

It is not always necessary that the moldings be welded together over the entire circumference of their frontal cross-sections. It is sometimes adequate if a number of welding points which fulfill the strength requirements, demanded in the individual case, are produced. In order to carry out the invention, it is irrelevant whether the ends are juxtaposed in a coplanar fashion at the non-welded points or whether they are irregularly spaced. However, it may be advisable to melt those portions of the non-coplanarly juxtaposed ends in a corresponding groove so that the welding face lies in a stepless plane. Thus, the floor space of all grooves of a plate should also lie in a plane.

In welding objects with a considerable interior cavity surrounded by an outer wall, it is desirable that only the hollow chambers remain open at the end faces and that the space between the individual hollow objects not be accessible from the end face. In such cases it is necessary that, at the end face edges, the hollow objects are juxtaposed in a coplanar fashion over their whole circumference, provided the circumference is not outside the bundle. The hollow objects may have, e.g., the shape of irregular hexagon and be juxtaposed like a honeycomb. Tubular plates having two smooth parallel outer walls and connecting paths can be put together in a stack and face welded. In principle, all hollow objects the cross-sectional section of which can be fused into a sealed area are suitable for such bundles.

For the purposes of the invention, it is adequate if only the ends of the hollow objects are juxtaposed in coplanar fashion. Moreover, the cross-section can have a different shape in the region away from the end faces. For example, pipes with primarily circular cross-sections can be used for ends that are expanded into irregular hexagonal cross-section. The region in which the ends are juxtaposed in the coplanar fashion has to be only slightly longer than the depth of the groove. For the production of heat exchangers made of bundles of pipes, it is advisable to use pipes with expanded end pieces such that, in fusing into a bundle, a passable space remains clear between the non-expanded sections of pipe.

Moldings which are rigid at room temperature and moldings that melt at temperatures ranging between approximately 50° C. and 300° C. may be regarded as thermoplastics. The invention, however, is not limited to these temperature limits. The term "melting temperature" refers to that temperature at which the plastic becomes soft and pliable to such an extent that two melts that have been produced separately fuse under pressure into a seamless, solidifying body. Provided the melts of various plastics fulfill this prerequisite, plastic objects made of different plastics can be welded into a bundle. Below the melting temperature, the plastics are in a thermal elastically softened state. Not until they are cooled below the softening temperature do they shift into the hard state (i.e., the glass state). Some examples of suitable plastics are polyethylene, polypropylene, polystyrene, polyvinylchloride, polyacrylate, polycarbonate, polysulfones, polyphenylene oxide, polyetheramide, polyether-etherketones, and polyimides.

The invention is explained in the following with the aid of FIGS. 1–4, using the welding of a bundle of objects with a considerable interior cavity surrounded with outer walls as an example. The scope of protection is not limited to this embodiment.

DETAILED DESCRIPTION OF THE PRESENTLY PREFERRED EMBODIMENT

Figure 1:
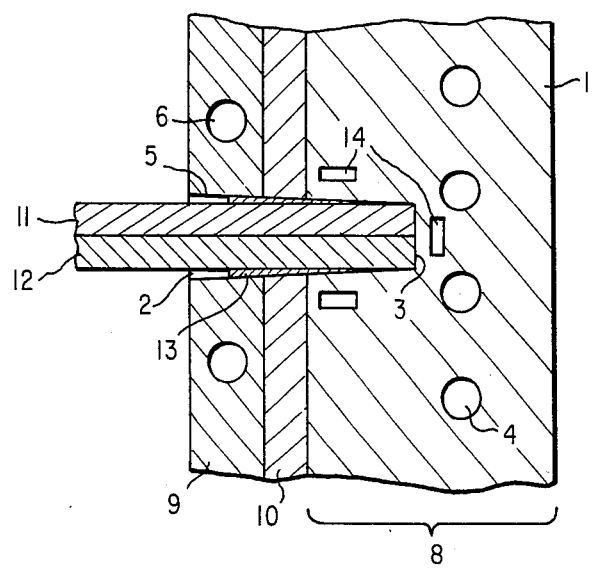
FIG. 1 is an enlarged cross-section through a heatable and coolable groove with the ends of the hollow objects sunk into the groove.

In FIG. 1, 1 represents a plate which can be pressed against a bundle of hollow objects. In the plate 1 is at least one groove 2 having a floor 3. The floor 3 of the groove 2 can be heated to or above the melting temperature of the plastic by means of heating elements 4, which can be passages through which a heating medium can flow. The groove 2 has a mouth 5 that can be cooled via coolant passages 6. The supply line for the heating and cooling elements 4 and 6 are not shown in order to facilitate the ease of comprehension.

The plate 1 comprises a first part 8, a second part 9, and a third part 10. The first part 8 of the plate 2 (which is the part of the plate 2 that can be heated above the melting temperature of the plastic) is preferably made of metal, such as steel, aluminum, or brass. The second part 9 of the plate 2 is thermally insulated from the first part 8. The second part 9 may also be made of metal. Between the first part 8 and the second part 9 it is expedient to embed the third part 10, which may be a layer made of heat insulating material—e.g., a mineral wool fiber, a heat-constant, fiber- or cloth-reinforced plastic compression molding material, or a ceramic body. Sometimes it suffices if the thermally insulated second part 9 itself is made of such a heat insulating material.

In order to weld two end pieces 11, 12 made of polyphenylene oxide, the floor 3 of the groove 2 is heated to 240° C. to 280° C., and the mouth 5 of the groove 2 is kept at a temperature below 130° C. by means of the cooling passages 6. It is generally preferred that the entry region be kept at a temperature below the softening temperature of the plastic.

The pressure produced by the insertion of the end pieces 11, 12 into the heated region of the groove 2 ranges, e.g., between 0.6 and 100 N/cm². Thus, a stream of melt 13 flows from the floor 3 of the groove 2 into the entry gap, where the melt 13 solidifies upon contact with the cool mouth 5.

As soon as the material extending into the heated space of the groove 2 fuses homogeneously and the space of the groove 2 is completely filled up, the heating can be turned off, and the material in the groove 2 can be cooled below its melting temperature (and, preferably, below its softening temperature). If this does not occur fast enough by means of thermal radiation to the ambient air, cooling can be effected by means of a cooling system. In addition to this, a coolant may flow through the heating elements 4 or through coolant passages 14.

After cooling, the welding point can be taken out of the groove 2. This is facilitated by means of a slight weldge-shaped cross-cut of the groove 2.

Figure 2:
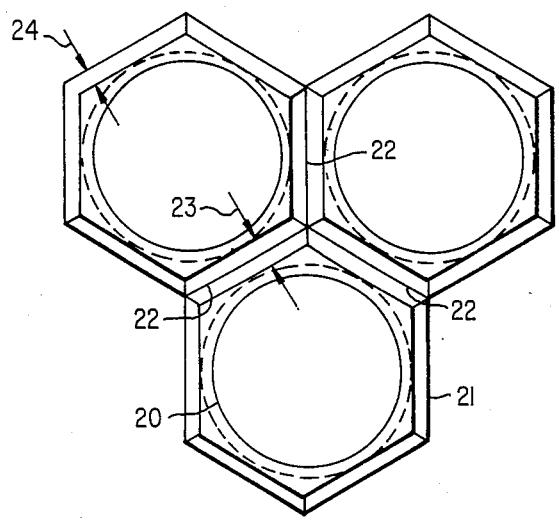
FIG. 2 shows the face of a bundle of pipes, and the cross-section in the middle region is shown by means of a broken line.

The bundle of pipes shown in FIG. 2 comprises three circular pipes 20 with hexagonally expanded end pieces 21. The end pieces 21 are juxtaposed in a coplanar fashion in a region 22. The wall thickness 23 ranges, e.g., in this region from 1 to 8 mm; in a region 24, the wall is half as thick—i.e., 0.5 to 4 mm.

Figure 3:
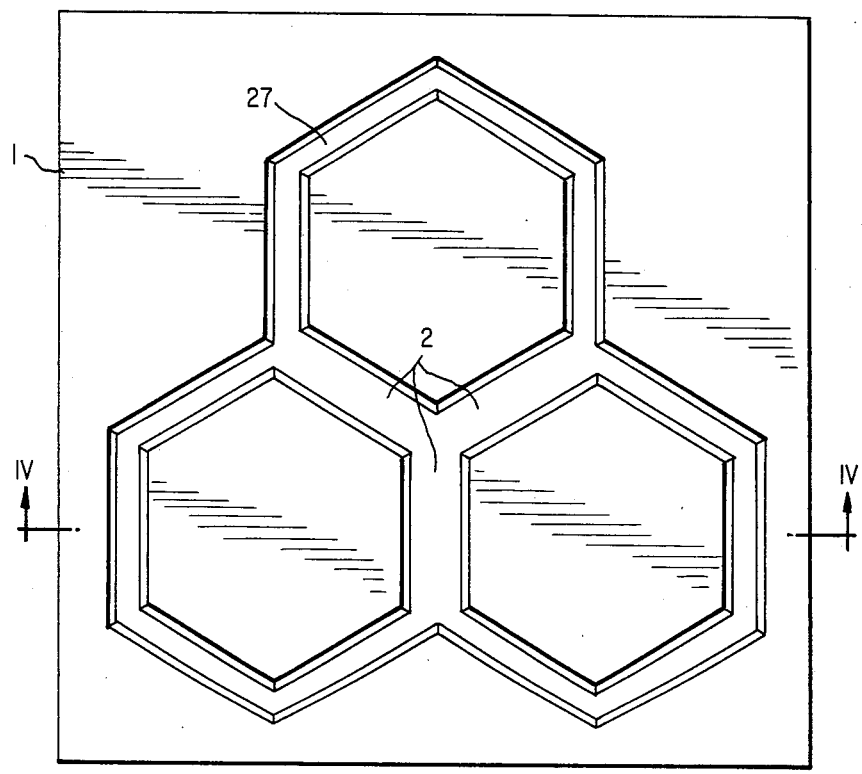
FIG. 3 is a top view of the plate that can be pressed against the bundle of pipes according to FIG. 2.
Figure 4:
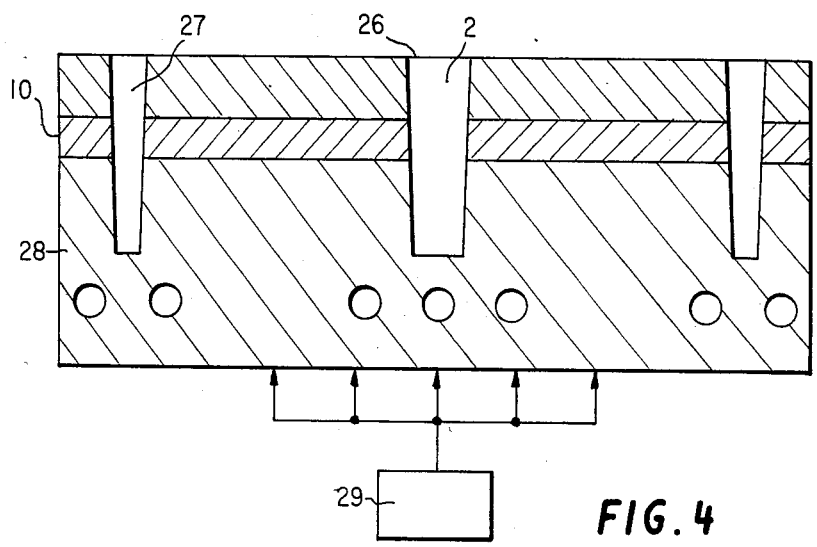
FIG. 4 is a cross-section along the line IV—IV through the plates shown in FIG. 3.

In order to weld the bundle of pipes shown in FIG. 2, the bundle is sunk into the plate 1 as shown in FIGS. 3 and 4. In the entry region 26, the grooves 2 for welding the end pieces 21 have a larger wall thickness than the wall thickness 23. They can, however, converge at the base of the grooves 2 to a width corresponding to the wall thickness 23, or even less. A boundary groove 27 serves only for the purpose of melting the outer wall down to the same level 28 as the region to be welded.

In principle, one plate 1 is adequate for carrying out this process. However, it is preferred that both end faces of a bundle be welded simultaneously by means of two plates 1. During the welding process, the plates 1 are rearranged in parallel, one on top of the other, by the amount by which the end pieces 21 are sunk into the grooves 2. It is advisable that a sliding apparatus 29 which moves at least one of the plates 1 and produces the necessary pressure for welding be used for this purpose. The plates 1 are mounted slidably in parallel on a support frame. The support frame preferably supports another support apparatus which accepts the bundles before and after the welding process.

What is claimed as new and desired to be secured by letters patent of the United States is:

1. An apparatus for face welding a bundle of thermoplastic moldings the end faces of which lie in a plane and the end face edges of which are juxtaposed in a coplanar fachion, said apparatus comprising:
   (a) a heatable and coolable plate that can be pressed against the end face of the bundle and that has grooves therein, said grooves being sized, shaped, and positioned to correspond to the cross-section of the bundle and being a little bit wider than the thickness of the coplanarly juxtaposed end face edges that are to be sunk into the grooves;
   (b) first means for heating the floor and the lower part of the walls of said grooves up to or above the melting temperature of the plastic, thereby melting the adjacent coplanarly juxtaposed end face edges of the theroplastic moldings;
   (c) second means for thermally insulating the entry of said grooves from the floor of said grooves on all sides;
   (d) third means for confining the melted thermoplastic resin in said grooves; and
   (e) fourth means for applying pressure through said heatable and coolable plate to the end face of the bundle, thereby pressurizing the melted thermoplastic resin confined in said grooves.

2. An apparatus as claimed in claim 1 wherein said third means comprises a cooling apparatus mounted in the entry region of said grooves.

3. An apparatus as claimed in claim I wherein the entry region of said grooves is made of a heat insulating material.

4. A apparatus for welding a bundle of thermoplastic moldings, said apparatus comprising:
   (a) a first plate;
   (b) a second plate disposed adjacent to said first plate;
   (c) at least one groove extending through said second plate and into said first plate, said at least one groove being sized, shaped, and positioned to receive an end of each bundle of thermoplastic moldings to be welded such that, at the bottom of said at least one groove, the ends to be welded together are tightly received in said at least one groove and, at the mouth of said at least one groove, the ends to be welded are loosely received in said at least one groove;
   (d) first means for heating said first plate to a temperature at least equal to the melting temperature of the thermoplastic moldings to be welded, thereby melting the adjacent ends of the thermoplastic moldings;
   (e) second means for maintaining the temperature of said second plate beneath the melting temperature of the thermoplastic moldings to be welded when said first plate is heated to a temperature at least equal to the melting temperature of the thermoplastic moldings to be welded, thereby confining the melted thermoplastic in said at least one groove; and
   (f) third means for applying pressure through said first plate to the end face of each bundle of thermoplastic moldings to be welded, thereby pressurizing the molded thermoplastic resin confined in said at least one groove.

5. An apparatus as recited in claim 4 wherein said second means comprises an insulating layer disposed between said first plate and said second plate.

6. An apparatus as recited in claim 4 wherein said second means comprise third means for cooling said second plate.

7. An apparatus as recited in claim 6 wherein said fourth means comprise a plurality of passages in said second plate for a coolant.

8. An apparatus as recited in claim 4 wherein said first means comprise a plurality of passages for a heated fluid.

9. An apparatus as recited in claim 4 and further comprising fifth means for cooling said first plate after each bundle of thermoplastic moldings has been face welded.

10. An apparatus as recited in claim 9 wherein said fifth means comprise a plurality of passages in said first plate for a coolant.

11. An apparatus as recited in claim 4 wherein said first plate and said second plate have planar, mutually parallel surfaces.

* * * * *

UNITED STATES PATENT AND TRADEMARK OFFICE
CERTIFICATE OF CORRECTION

PATENT NO. : 4,797,173

DATED : January 10, 1989

INVENTOR(S) : Gross, Heinz, et al

It is certified that error appears in the above-identified patent and that said Letters Patent is hereby corrected as shown below:

On the title page, item [19] should be change from "Grob et al." to --Gross et al.--

Signed and Sealed this

Nineteenth Day of November, 1991

Attest:

HARRY F. MANBECK, JR.

*Attesting Officer*      *Commissioner of Patents and Trademarks*